US010982385B2

(12) United States Patent
Kinoe et al.

(10) Patent No.: US 10,982,385 B2
(45) Date of Patent: Apr. 20, 2021

(54) PRETREATMENT LIQUID FOR INKJET TEXTILE PRINTING, METHOD FOR PRODUCING PRINTED TEXTILE ITEM, AND INK SET FOR INKJET TEXTILE PRINTING

(71) Applicant: RISO KAGAKU CORPORATION, Tokyo (JP)

(72) Inventors: Kokoro Kinoe, Ibaraki (JP); Akiko Hayashi, Ibaraki (JP); Takahisa Yamazaki, Ibaraki (JP); Shunsuke Uozumi, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 101 days.

(21) Appl. No.: 16/298,573

(22) Filed: Mar. 11, 2019

(65) Prior Publication Data
US 2019/0352846 A1 Nov. 21, 2019

(30) Foreign Application Priority Data

May 18, 2018 (JP) .............................. JP2018-096019

(51) Int. Cl.
D06P 1/44 (2006.01)
D06P 5/30 (2006.01)
D06P 3/60 (2006.01)
D06P 1/52 (2006.01)
C09D 11/54 (2014.01)
D06P 1/50 (2006.01)
C09D 11/322 (2014.01)

(52) U.S. Cl.
CPC .............. D06P 1/445 (2013.01); C09D 11/54 (2013.01); D06P 1/50 (2013.01); D06P 1/5285 (2013.01); D06P 3/60 (2013.01); D06P 5/30 (2013.01); C09D 11/322 (2013.01)

(58) Field of Classification Search
CPC ..... D06M 15/09; D06M 15/263; B41J 3/4078
See application file for complete search history.

(56) References Cited

U.S. PATENT DOCUMENTS

| | | | |
|---|---|---|---|
| 6,506,220 B2* | 1/2003 | Clark | C11D 3/10 510/470 |
| 8,651,648 B2* | 2/2014 | Sato | B41M 5/0017 347/96 |
| 10,640,917 B2* | 5/2020 | Pan | D06P 5/30 |
| 2011/0102497 A1 | 5/2011 | Sato et al. | |
| 2011/0200751 A1* | 8/2011 | Yatake | D06P 1/6735 427/261 |
| 2012/0304402 A1* | 12/2012 | Miracle | C09B 29/0059 8/531 |
| 2013/0245242 A1* | 9/2013 | Torres | C11D 3/40 534/794 |
| 2015/0322384 A1* | 11/2015 | Butterfield | C11D 3/42 510/324 |
| 2017/0058453 A1* | 3/2017 | Pan | D06P 5/2072 |
| 2017/0136782 A1 | 5/2017 | Yatake | |
| 2018/0223043 A1* | 8/2018 | Zhao | C08G 69/24 |

FOREIGN PATENT DOCUMENTS

| | | | | |
|---|---|---|---|---|
| EP | 3084069 A1 * | 10/2016 | | D06P 1/5242 |
| JP | 2007217829 A | 8/2007 | | |
| JP | 2011168912 A | 9/2011 | | |
| WO | 2009084600 A1 | 7/2009 | | |

* cited by examiner

Primary Examiner — Huan H Tran
(74) Attorney, Agent, or Firm — Hamre, Schumann, Mueller & Larson, P.C.

(57) ABSTRACT

A pretreatment liquid for inkjet textile printing is disclosed that includes water and a cellulose-based polymer having a weight average molecular weight of at least 50,000. A method for producing a printed textile item and an ink set for inkjet textile printing are also disclosed.

20 Claims, No Drawings

PRETREATMENT LIQUID FOR INKJET TEXTILE PRINTING, METHOD FOR PRODUCING PRINTED TEXTILE ITEM, AND INK SET FOR INKJET TEXTILE PRINTING

CROSS REFERENCE TO RELATED APPLICATIONS

This application is based upon and claims the benefit of priority from the prior Japanese Patent Application No. 2018-096019 filed on May 18, 2018, the entire contents of which are incorporated by reference herein.

BACKGROUND OF THE INVENTION

Field of the Invention

Embodiments of the present description relate to a pretreatment liquid for inkjet textile printing, a method for producing a printed textile item, and an ink set for inkjet textile printing.

Description of the Related Art

Among methods for printing images such as text, pictures or designs onto fabrics, inkjet textile printing methods which enable direct printing using pigment inks are attracting much attention.

Because fabrics exhibit good absorption of inks, making it difficult to retain the pigment at the fabric surface, items obtained using inkjet textile printing methods using pigment inks tend to be prone to poor color development.

JP 2011-168912 A discloses pretreating a fabric with a pretreatment agent containing a cationic polymer prior to printing ink onto the fabric as a technique for obtaining a printed textile item having superior color development.

WO 2009/084600 discloses a treatment liquid containing a water-soluble polyvalent metal salt and a carboxymethyl cellulose and the like, and also discloses an inkjet textile printing method that uses this treatment liquid and may yield high image density and superior durability of the ink coating film.

In aqueous pigment inks, the dispersibility of a hydrophobic pigment in water may be usually enhanced by adsorbing a hydrophilic group to the hydrophobic pigment, and, therefore, the pigment tends to exhibit good compatibility with water, meaning wet rubbing of the printed textile item tends to cause fading.

In relation to the fastness of printed textile items, JP 2007-217829 A discloses providing an ink receiving layer using a treatment liquid containing a carboxymethyl cellulose, as a technique for preventing the ink receiving layer formed on the fabric by the pretreatment from detaching from the fabric as a result of vibrations caused by expansion, contraction or transport of the fabric during an inkjet textile printing process, and also discloses a method for obtaining a printed textile item by using an ink containing a dye on a fabric provided with this ink receiving layer.

SUMMARY OF THE INVENTION

JP 2011-168912 A discloses the use of a pretreatment agent containing a cationic polymer, and WO 2009/084600 discloses the use of a pretreatment agent containing a polyvalent metal salt. However, because cationic polymers and polyvalent metal salts are water-soluble, when treatment is performed using a pretreatment liquid containing one of these materials, suppression of fading caused by wet rubbing may be sometimes inadequate.

Further, when the technique disclosed in JP 2007-217829 A is used with a pigment ink, the image density may be sometimes insufficient.

One embodiment of the present invention provides a pretreatment liquid for inkjet textile printing containing water and a cellulose-based polymer having a weight average molecular weight of at least 50,000.

Another embodiment of the present invention provides a method for producing a printed textile item that includes applying the above pretreatment liquid for inkjet textile printing to a fabric containing cellulose fibers, and forming an image using an ink for inkjet textile printing containing a pigment and water, using an inkjet recording method, on the fabric to which the pretreatment liquid for inkjet textile printing has been applied.

Another embodiment of the present invention provides an ink set for inkjet textile printing including the above pretreatment liquid for inkjet textile printing and an ink for inkjet textile printing containing a pigment and water.

DETAILED DESCRIPTION OF THE EMBODIMENTS

Embodiments of the present invention are described below in detail, but needless to say, the present invention is in no way limited by these embodiments, and various modifications and alterations are possible.

<Pretreatment Liquid>

A pretreatment liquid for inkjet textile printing of one embodiment is a pretreatment liquid for inkjet textile printing containing water and a cellulose-based polymer having a weight average molecular weight of at least 50,000.

In the following description, the "pretreatment liquid for inkjet textile printing" is sometimes referred to as simply the "pretreatment liquid". Further, an "ink for inkjet textile printing" is sometimes referred to as simply an "ink".

This pretreatment liquid may be used favorably on fabrics containing cellulose fibers.

This pretreatment liquid may be used favorably as a pretreatment liquid for inkjet textile printing for forming an image using an ink for inkjet textile printing containing a pigment and water by an inkjet recording method.

In some embodiments, this pretreatment liquid can be used, for example, as a pretreatment liquid for inkjet textile printing for forming an image on a fabric containing cellulose fibers using an ink for inkjet textile printing containing a pigment and water by an inkjet recording method.

For example, in those cases in which this pretreatment liquid is used as a pretreatment liquid for inkjet textile printing for forming an image on a fabric containing cellulose fibers using an ink for inkjet textile printing containing a pigment and water by an inkjet ink method, in some embodiments, fading caused by wet rubbing may be suppressed, and the image density of a printed textile item may be improved.

With respect to the reasons therefor, although not constrained by any particular theory, it may be thought as follows. In those cases in which this pretreatment liquid is applied to a fabric containing cellulose fibers, interactions between the hydroxyl groups of the cellulose-based polymer contained in the pretreatment liquid and the hydroxyl groups of the cellulose fibers of the fabric may result in the formation of a film on the fabric that exhibits superior bonding strength to the fabric. Using a cellulose-based polymer having a large molecular weight, the breaking strength of the film of the pretreatment liquid formed on the fabric may be further enhanced, and the bonding strength of the film to the fabric may be further improved due to an anchoring effect. Moreover, the use of a cellulose-based polymer having a large molecular weight may be expected to yield improved water resistance for the film. It is thought that by forming a film having superior bonding strength to the fabric and superior water resistance, detachment of the film due to rubbing may be suppressed, and the problem of moisture causing the film to swell and become brittle and then rupturing may be suppressed, and that damage to the fabric itself as a result of rubbing may also be reduced by the film. As such, detachment of the film and fading caused by wet rubbing may be suppressed.

Further, it is also thought that by forming a film of the pretreatment liquid on the fabric, gaps in the fabric surface may be covered by the film, meaning the ink pigment may be better retained at the fabric surface, thereby improving the image density.

The pretreatment liquid may be applied to the fabric prior to formation of an image on the fabric by an inkjet recording method using an ink.

The pretreatment liquid preferably contains a cellulose-based polymer having a weight average molecular weight of at least 50,000.

From the viewpoint of suppressing fading caused by wet rubbing, the weight average molecular weight of the cellulose-based polymer is preferably at least 50,000, more preferably at least 60,000, and even more preferably 70,000 or greater. When the weight average molecular weight of the cellulose-based polymer is at least 50,000, a film having superior water resistance and superior bonding strength to the fabric may be formed, and fading caused by wet rubbing may be better suppressed.

The weight average molecular weight of the cellulose-based polymer may be typically not more than 5,000,000 and may be 1,000,000 or less.

The weight average molecular weight of the cellulose-based polymer is a value obtained using the viscosity method.

Examples of compounds that may be used as the cellulose-based polymer having a weight average molecular weight of at least 50,000 include hydroxyethyl cellulose, hydroxypropyl methyl cellulose, hydroxyethyl methyl cellulose and methyl cellulose.

From the viewpoint of improving the suppression of fading caused by wet rubbing, the cellulose-based polymer having a weight average molecular weight of at least 50,000 is preferably a hydroxypropyl methyl cellulose, hydroxyethyl methyl cellulose or methyl cellulose. These compounds may further enhance the water resistance of the film, enabling better suppression of fading caused by wet rubbing. In one embodiment, the cellulose-based polymer having a weight average molecular weight of at least 50,000 preferably contains at least one compound selected from the group consisting of hydroxypropyl methyl cellulose, hydroxyethyl methyl cellulose and methyl cellulose.

Commercially available products may be used as the cellulose-based polymer having a weight average molecular weight of at least 50,000. Examples of commercially available cellulose-based polymers having a weight average molecular weight of at least 50,000 include SANHEC L (hydroxyethyl cellulose, weight average molecular weight: 90,000) and SANHEC M (hydroxyethyl cellulose, weight average molecular weight: 720,000) manufactured by Sansho Co., Ltd., and METOLOSE 65SH-50 (hydroxypropyl methyl cellulose, weight average molecular weight: 100,000), METOLOSE 65SH-400 (hydroxypropyl methyl cellulose, weight average molecular weight: 170,000), METOLOSE SEB-04T (hydroxyethyl methyl cellulose, weight average molecular weight: 300,000), METOLOSE SM-15 (methyl cellulose, weight average molecular weight: 70,000), METOLOSE SM-100 (methyl cellulose, weight average molecular weight: 120,000) and METOLOSE SM-400 (methyl cellulose, weight average molecular weight: 170,000) manufactured by Shin-Etsu Chemical Co., Ltd.

A single cellulose-based polymer having a weight average molecular weight of at least 50,000 may be used alone, or a combination of two or more such polymers may be used.

From the viewpoints of ensuring satisfactory coating of the surface of the fabric by the film of the pretreatment liquid, enhancing the bonding strength between the fabric and the film of the pretreatment liquid, and better suppressing fading caused by wet rubbing, the amount of the cellulose-based polymer having a weight average molecular weight of at least 50,000 in the pretreatment liquid, relative to the total mass of the pretreatment liquid, is preferably at least 0.2% by mass, more preferably at least 1.0% by mass, and even more preferably 2.0% by mass or greater. From the viewpoints of facilitating leveling when the pretreatment liquid forms a film, thus ensuring uniformity of the surface of the film of the pretreatment liquid, and enhancing the bonding strength between the film of the ink and the film of the pretreatment liquid, thereby better suppressing fading caused by wet rubbing, the amount of the cellulose-based polymer having a weight average molecular weight of at least 50,000 in the pretreatment liquid, relative to the total mass of the pretreatment liquid, is preferably not more than 10.0% by mass, and more preferably 8.0% by mass or less.

The pretreatment liquid preferably contains mainly water as the aqueous solvent. There are no particular limitations on this water, and examples include ion-exchanged water, distilled water and ultra-pure water.

The amount of water in the pretreatment liquid, relative to the total mass of the pretreatment liquid, is preferably at least 60% by mass, and more preferably 65% by mass or greater. The amount of water in the pretreatment liquid may, for example, be not more than 99% by mass, not more than 95% by mass, or 90% by mass or less.

The pretreatment liquid preferably contains a water-dispersible resin.

The water-dispersible resin may disperse in the water in particulate form without dissolving, and may form an oil-in-water (O/W) emulsion.

In those cases in which the water-dispersible resin is added to the pretreatment liquid, the bonding strength between the fabric and the film may be further enhanced. Further, because the water-dispersible resin is, in general, insoluble in water, the water resistance of the obtained film in which the water-dispersible resin is used may tend to be high. Accordingly, in those cases in which the water-dispersible resin is added to the pretreatment liquid, suppression of fading caused by wet rubbing may be enhanced.

Examples of the water-dispersible resin include water-dispersible urethane resins, water-dispersible acrylic resins, water-dispersible vinyl acetate resins, water-dispersible styrene-(meth)acrylic resins, water-dispersible vinyl chloride resins, and water-dispersible polyamide resins.

Urethane resins have an urethane linkage. Examples of the urethane resins that may be used include polyether urethane resins that include, beside an urethane linkage, an ether linkage within the main chain, polyester urethane resins that include, beside an urethane linkage, an ester linkages within the main chain, and polycarbonate urethane resins that include, beside an urethane linkage, a carbonate linkage within the main chain.

Cationic resins, anionic resins and nonionic resins may all be used as the water-dispersible resin.

A cationic water-dispersible resin may form positively charged resin particles in which the surfaces of the particles bear a plus charge. Examples of the cationic water-dispersible resin include those in which the cationic functional groups of the resin may exist at the surfaces of the particles, such as in a self-emulsifying resin, and those in which the particles may have been subjected to a surface treatment to adhere a cationic dispersant to the surfaces of the resin particles. Representative examples of the cationic functional groups include primary, secondary and tertiary amino groups, or a pyridine group, imidazole group, benzimidazole group, triazole group, benzotriazole group, pyrazole group or benzopyrazole group, whereas examples of the cationic dispersant include primary, secondary, tertiary and quaternary amino group-containing acrylic polymers, polyethyleneimines, cationic polyvinyl alcohol resins, and cationic water-soluble multibranched polyesteramide resins.

The amount of surface charge on the cationic water-dispersible resin can be evaluated using a particle charge meter. The amount of surface charge on the cationic resin is preferably at least +50 eq/g, and more preferably +80 eq/g or greater. Examples of particle charge meters that can be used include the colloidal particle charge meter Model CAS manufactured by Nihon Rufuto Co., Ltd.

An anionic water-dispersible resin may form negatively charged resin particles in which the surfaces of the particles bear a minus charge. Examples of the anionic water-dispersible resin include those in which the anionic functional groups of the resin may exist at the surfaces of the particles, such as in a self-emulsifying resin, and those in which the particles may have been subjected to a surface treatment to adhere an anionic dispersant to the surfaces of the resin particles. Representative examples of the anionic functional groups include a carboxyl group and a sulfo group, and examples of the anionic dispersant include anionic surfactants and the like.

The amount of surface charge on the anionic water-dispersible resin can be evaluated using a particle charge meter. The amount of surface charge on the anionic resin is preferably at least −30 eq/g, and more preferably −60 eq/g or greater. Examples of particle charge meters that can be used include the colloidal particle charge meter Model CAS manufactured by Nihon Rufuto Co., Ltd.

From the viewpoint of further improving the image density, a cationic water-dispersible resin is preferred as the water-dispersible resin. It is thought that the positive charge of the cationic water-dispersible resin may neutralize the negative charge on the pigment surface, causing the pigment to aggregate, with the aggregated pigment being more readily retained at the surface of the fabric, thereby increasing the image density.

Among the various resins, cationic water-dispersible urethane resins are more preferred. The water-dispersible resin preferably contains a cationic water-dispersible urethane resin.

The glass transition temperature of the water-dispersible resin, although not particularly limited, is preferably at least −40° C., and more preferably −20° C. or higher. In those cases in which the glass transition temperature falls within this range, the bonding strength may be further enhanced by the anchoring effect, meaning fading caused by wet rubbing may be better suppressed.

The glass transition temperature of the water-dispersible resin may be, for example, typically not higher than 50° C.

Commercially available products may be used as the water-dispersible resin. Examples of these commercially available products include products manufactured by DKS Co., Ltd., such as SUPERFLEX 620 (a cationic water-dispersible polyester urethane resin, glass transition temperature: 43° C.), SUPERFLEX 650 (a cationic water-dispersible polycarbonate urethane resin, glass transition temperature: −17° C.), and SUPERFLEX 500M (a nonionic water-dispersible polyester urethane resin, glass transition temperature: −39° C.), products manufactured by The Nippon Synthetic Chemical Industry Co., Ltd., such as Mowinyl 7820 (a cationic water-dispersible acrylic resin, glass transition temperature: 4° C.) and Mowinyl 3500 (a cationic water-dispersible vinyl acetate resin, glass transition temperature: 30° C.), and products manufactured by DKS Co., Ltd., such as SUPERFLEX 150 (an anionic water-dispersible polyester-polyether urethane resin, glass transition temperature: 40° C.), SUPERFLEX 210 (an anionic water-dispersible polyester urethane resin, glass transition temperature: 41° C.), SUPERFLEX 420 (an anionic water-dispersible polycarbonate urethane resin, glass transition temperature: −10° C.), SUPERFLEX 460 (an anionic water-dispersible polycarbonate urethane resin, glass transition temperature: −21° C.), SUPERFLEX 470 (an anionic water-dispersible polycarbonate urethane resin, glass transition temperature: −31° C.), SUPERFLEX 740 (an anionic water-dispersible polyester urethane resin, glass transition temperature: −34° C.), SUPERFLEX 820 (an anionic water-dispersible polyester urethane resin, glass transition temperature: 46° C.), SUPERFLEX 860 (an anionic water-dispersible polyester urethane resin, glass transition temperature: 36° C.), SUPERFLEX E-2000 (a nonionic water-dispersible polyester urethane resin, glass transition temperature: −38° C.) and SUPERFLEX E-4800 (a nonionic water-dispersible polyether urethane resin, glass transition temperature: −68° C.).

A single water-dispersible resin may be used alone, or a combination of two or more resins may be used.

From the viewpoint of further enhancing the suppression of fading caused by wet rubbing, the amount of the water-dispersible resin in the pretreatment liquid, relative to the total mass of the pretreatment liquid, is preferably at least 1.0% by mass, and more preferably 1.5% by mass or greater. From the viewpoints of further enhancing the suppression of fading caused by wet rubbing, the amount of the water-dispersible resin in the pretreatment liquid, relative to the total mass of the pretreatment liquid, is preferably not more than 20.0% by mass, and more preferably 15.0% by mass or less.

From the viewpoint of further suppressing fading caused by wet rubbing, if the amount (% by mass) of the cellulose-based polymer having a weight average molecular weight of at least 50,000 relative to the total mass of the pretreatment liquid is termed A, and the amount (% by mass) of the water-dispersible resin relative to the total mass of the pretreatment liquid is termed B, then the pretreatment liquid preferably satisfies $2.0<A+B<15.0$. In those cases in which A+B is greater than 2.0, the bonding strength between the film of the pretreatment liquid and the fabric may be further improved, and fading upon wet rubbing may be more easily suppressed. On the other hand, in those cases in which A+B is less than 15.0, the pretreatment liquid may tend to have a viscosity that is not overly high, an improvement in the bonding strength due to an anchoring effect may be more easily obtained, and fading upon wet rubbing may be better suppressed. The value of A+B is more preferably 2.5 or greater. Further, A+B is more preferably not more than 14.5, and even more preferably 14.0 or less.

It is preferable that the ratio of the amount (% by mass) B of the water-dispersible resin relative to the total mass of the pretreatment liquid, relative to the amount (% by mass) A of the cellulose-based polymer having a weight average molecular weight of at least 50,000 relative to the total mass of the pretreatment liquid, namely B/A, satisfies 0.5<B/A<15.0. When B/A is greater than 0.5, an improvement in the bonding strength between the fabric and the film of the treatment liquid may be more easily obtained, and fading upon wet rubbing may be more easily suppressed. When B/A is less than 15.0, the water resistance of the film of the pretreatment liquid may be more easily ensured, and fading upon wet rubbing may be better suppressed. The value of B/A is more preferably at least 1.0, and even more preferably 1.2 or greater. Further, B/A is more preferably not more than 14.0, and even more preferably 13.0 or less.

From the viewpoint of better suppressing fading caused by wet rubbing, the amount (% by mass) A of the cellulose-based polymer having a weight average molecular weight of at least 50,000 relative to the total mass of the pretreatment liquid, and the amount (% by mass) B of the water-dispersible resin relative to the total mass of the pretreatment liquid preferably satisfy both 2.0<A+B<15.0 and 0.5<B/A<15.0.

The pretreatment liquid may also contain a surfactant. Either one surfactant, or two or more surfactants, selected from among those surfactants which may be used in the ink as described below may be used as the surfactant.

The amount of the surfactant in the pretreatment liquid, relative to the total mass of the pretreatment liquid, is preferably at least 0.1% by mass, more preferably at least 0.3% by mass, and even more preferably 0.5% by mass or greater. The amount of the surfactant in the pretreatment liquid, relative to the total mass of the pretreatment liquid, is preferably not more than 30% by mass, more preferably not more than 20% by mass, and even more preferably 10% by mas or less.

The pretreatment liquid may, if necessary, also contain one or more other components such as water-soluble organic solvents, antifoaming agents, pH adjusters, antioxidants and preservatives.

There are no particular limitations on the method used for producing the pretreatment liquid, and production may be performed using appropriate conventional methods. For example, the pretreatment liquid may be produced by using a conventional stirring device to mix all of the components, either in a single batch or in a number of separate batches.

The pretreatment liquid of the present embodiment may be used favorably in inkjet textile printing for forming an image on a fabric containing cellulose fibers using an ink for inkjet textile printing containing a pigment and water by an inkjet recording method.

The fabric containing cellulose fibers and the ink for inkjet textile printing that may be used in combination with the pretreatment liquid are described below.

The fabric preferably contains cellulose fibers. Examples of the fabric include woven fabrics, knitted fabrics and non-woven fabrics. Any conventional cellulose fibers may be used as the cellulose fibers, and for example, cotton, rayon, tencel, or cupra or the like may be used. In addition to the cellulose fibers, other types of fibers such as polyester fibers and nylon fibers may be subjected to mixed spinning, fiber blending, intertwisting, interweaving or interknitting with the cellulose fibers, but in terms of improving the image density and better suppressing fading upon wet rubbing, a fabric containing at least 50% by mass of cellulose fibers is preferred, and a fabric containing at least 75% by mass of cellulose fibers is more preferred. The fabric may contain 100% by mass of cellulose fibers.

The ink for inkjet textile printing preferably contains a pigment and water.

Any of the pigments typically used in this technical field may be used as the pigment.

A single pigment may be used alone, or a combination of two or pigments may be used.

The amount added of the pigment varies depending on the type of pigment used, but from the viewpoint of color development and the like, the ink preferably contains about 0.1 to 30% by mass, and more preferably 0.1 to 15% by mass, of the pigment relative to the total mass of the ink.

Examples of non-white pigments include organic pigments, examples thereof including azo-based pigments, phthalocyanine-based pigments, dye-based pigments, condensed polycyclic pigments, nitro-based pigments and nitroso-based pigments (with specific examples including brilliant carmine 6B, lake red C, Watchung red, disazo yellow, Hansa yellow, phthalocyanine blue, phthalocyanine green, alkali blue and aniline black); inorganic pigments, examples thereof including metals such as cobalt, iron, chromium, copper, zinc, lead, titanium, vanadium, manganese and nickel, as well as metal oxides and sulfides, and yellow ocher, ultramarine and iron blue pigments; and carbon blacks such as furnace carbon black, lamp black, acetylene black and channel black. The average particle size of the pigment is preferably at least 50 nm from the viewpoint of the color development properties. The average particle size of the pigment is preferably not more than 500 nm from the viewpoint of discharge stability. For example, the average particle size of the pigment is preferably from 50 to 500 nm, and more preferably from 50 to 200 nm.

Examples of white pigments include inorganic pigments such as titanium oxide, zinc oxide, zinc sulfide, antimony oxide and zirconium oxide. Besides inorganic pigments, hollow resin microparticles and polymer microparticles may also be used. Of these pigments, from the viewpoint of opacity, the use of titanium oxide is preferred. The average particle size of the titanium oxide is preferably at least 50 nm from the viewpoint of opacity, but is preferably not more than 500 nm from the viewpoint of discharge stability. In those cases where titanium oxide is used, titanium oxide that has undergone a surface treatment with alumina or silica is preferably used in order to inhibit any photocatalytic action. The amount of this surface treatment preferably represents about 5 to 20% by mass of the pigment.

A pigment dispersant typified by polymeric dispersants and surfactant-type dispersants is preferably used to ensure stable dispersion of the pigment in the ink.

Examples of commercially available polymeric dispersants include the TEGO Dispers series products manufactured by Evonik Industries AG (examples thereof including TEGO Dispers 740W, TEGO Dispers 750W, TEGO Dispers 755W, TEGO Dispers 757W and TEGO Dispers 760), the Solsperse series products manufactured by The Lubrizol Corporation (examples thereof including Solsperse 20000, Solsperse 27000, Solsperse 41000, Solsperse 41090, Solsperse 43000, Solsperse 44000 and Solsperse 46000), the Joncryl series products manufactured by Johnson Polymer, Inc. (examples thereof including Joncryl 57, Joncryl 60, Joncryl 62, Joncryl 63, Joncryl 71 and Joncryl 501), as well as DISPERBYK-102, DISPERBYK-185, DISPERBYK-190, DISPERBYK-193 and DISPERBYK-199 manufactured by BYK Additives & Instruments GmbH, and Polyvinylpyrrolidone K-30 and Polyvinylpyrrolidone K-90 manufactured by DKS Co. Ltd.

Examples of the surfactant-type dispersants include anionic surfactants such as t the DEMOL series products manufactured by Kao Corporation (examples thereof including DEMOL EP, DEMOL N, DEMOL RN, DEMOL NL, DEMOL RNL and DEMOL T-45), and nonionic surfactants such as the products of the EMULGEN series manufactured by Kao Corporation (examples thereof including EMULGEN A-60, EMULGEN A-90, EMULGEN A-500, EMULGEN B-40, EMULGEN L-40 and EMULGEN 420).

One of these pigment dispersants may be used singly. These pigment dispersants may also be used in combinations containing a plurality of different dispersants.

In those cases in which a pigment dispersant is used in the ink, there are no particular limitations on the amount of the pigment dispersant added to the ink, which varies depending on the type of dispersant used, but generally, the amount of the active ingredient (solid fraction) of the pigment dispersant, expressed as a mass ratio relative to a value of 1 for the pigment, is preferably within a range from 0.005 to 0.5.

Self-dispersing pigments in which the pigment surface has been modified with hydrophilic functional groups may be used. Examples of commercially available self-dispersing pigments include FUJI SP BLACK 8154 manufactured by Fuji Pigment Co., Ltd., the CAB-O-JET series manufactured by Cabot Corporation (including CAB-O-JET 200, CAB-O-JET 300, CAB-O-JET 250C, CAB-O-JET 260M and CAB-O-JET 270C), and the products BONJET BLACK CW-1S, CW-2, and CW-3 and the like manufactured by Orient Chemical Industries, Ltd.

Microencapsulated pigments in which the pigment is coated with a resin may also be used.

The ink preferably contains mainly water as the aqueous solvent. There are no particular limitations on this water, but water containing minimal ionic components is preferred. In particular, from the viewpoint of the ink storage stability, the amount of polyvalent metal ions such as calcium ions is preferably kept low. Examples of the water include ion-exchanged water, distilled water and ultra-pure water.

From the viewpoint of viscosity control, the amount of water in the ink, relative to the total mass of the ink, is preferably from 20% by mass to 80% by mass, and more preferably from 30% by mass to 70% by mass.

The ink preferably contains a water-soluble organic solvent.

From the viewpoints of viscosity control and moisture retention, a water-soluble organic solvent that is liquid at room temperature and miscible with water is preferred as the water-soluble organic solvent. Examples of water-soluble organic solvents that may be used include lower alcohols such as methanol, ethanol, 1-propanol, isopropanol, 1-butanol, 2-butanol, isobutanol, t-butanol, 1,3-propanediol, 1,3-butanediol, 1,2-butanediol, 1,2-pentanediol, 1,2-hexanediol and 2-methyl-2-propanol; glycols such as ethylene glycol, diethylene glycol, triethylene glycol, tetraethylene glycol, pentaethylene glycol, propylene glycol, dipropylene glycol, tripropylene glycol and butylene glycol; glycerols such as glycerol and diglycerol; acetins (monoacetin, diacetin and triacetin); glycol derivatives such as diethylene glycol monomethyl ether, diethylene glycol monobutyl ether, diethylene glycol dimethyl ether, diethylene glycol monoethyl ether acetate, triethylene glycol monomethyl ether, triethylene glycol monoethyl ether, triethylene glycol monopropyl ether, triethylene glycol monobutyl ether, tripropylene glycol monobutyl ether, triethylene glycol monohexyl ether, tetraethylene glycol monomethyl ether, tetraethylene glycol monoethyl ether, tetraethylene glycol monobutyl ether, tetraethylene glycol dimethyl ether, tetraethylene glycol diethyl ether, propylene glycol monomethyl ether, ethylene glycol monoethyl ether, ethylene glycol monomethyl ether and ethylene glycol mono-n-butyl ether; as well as triethanolamine, 2-pyrrolidone, 1-methyl-2-pyrrolidone, β-thiodiglycol, sulfolane, methyl ethyl ketone and ethyl acetate. Low-molecular weight polyalkylene glycols, including polyethylene glycols having an average molecular weight within a range from 190 to 630, such as an average molecular weight of 200, 300, 400 or 600, diol-type polypropylene glycols having an average molecular weight within a range from 200 to 600, such as an average molecular weight of 400, and triol-type polypropylene glycols having an average molecular weight within a range from 250 to 800, such as an average molecular weight of 300 or 700, may also be used.

One of these water-soluble organic solvents may be used alone, or a combination of two or more solvents may be used.

From the viewpoints of viscosity control and moisture retention, the amount of the water-soluble solvent in the ink, relative to the total mass of the ink, is preferably from 1 to 80% by mass, and more preferably from 1 to 60% by mass, and for example, may be from 1 to 50% by mass, or from 5 to 40% by mass.

The ink preferably contains a water-dispersible resin. For example, this water-dispersible resin may be either one resin, or a combination of two or more resins, selected from among the resins described above for the water-dispersible resin that may be included in the aforementioned pretreatment liquid. The water-dispersible resin may be anionic, cationic or nonionic, but an anionic water-dispersible resin is preferred.

The amount of the water-dispersible resin in the ink, relative to the total mass of the ink, is preferably at least 0.1% by mass, and more preferably 1% by mass or greater. The amount of the water-dispersible resin in the ink, relative to the total mass of the ink, is preferably not more than 20% by mass, and even more preferably 10% by mass or less.

The ink may also contain other components as appropriate. Examples of these other components include surface tension adjusters (surfactants), antioxidants, preservatives and crosslinking agents.

Examples of surface tension adjusters that may be used include anionic surfactants, cationic surfactants, amphoteric surfactants and nonionic surfactants, as well as polymer-based, silicone-based and fluorine-based surfactants.

The ink preferably contain a surfactant, as it may facilitate stable discharge of the ink by an inkjet method, and also may make it easier to appropriately control penetration of the ink. The amount added of the surfactant (the total amount of surfactants in those cases when a surfactant is also used as a pigment dispersant) varies depending on the type of surfactant used, but from the viewpoints of the ink surface tension and the rate of ink penetration into substrates such as fabrics, the amount is preferably within a range from 0.1 to 10% by mass of the ink.

Specific examples of anionic surfactants include products manufactured by Kao Corporation, including the EMAL series products (examples thereof including EMAL 0, EMAL 10, EMAL 2F, EMAL 40 and EMAL 20C), the NEOPELEX series products (examples thereof including NEOPELEX GS, NEOPELEX G-15, NEOPELEX G-25 and NEOPELEX G-65), the PELEX series products (examples thereof including PELEX OT-P, PELEX TR, PELEX CS, PELEX TA, PELEX SS-L and PELEX SS-H), and the DEMOL series products (examples thereof including DEMOL N, DEMOL NL, DEMOL RN and DEMOL MS).

Examples of cationic surfactants include products manufactured by Kao Corporation, including the ACETAMIN series products (examples thereof including ACETAMIN 24 and ACETAMIN 86), the QUARTAMIN series products (examples thereof including QUARTAMIN 24P, QUARTAMIN 86P, QUARTAMIN 60W and QUARTAMIN 86W), and the SANISOL series products (examples thereof including SANISOL C and SANISOL B-50).

Examples of nonionic surfactants include acetylene glycol-based surfactants, such as the Surfynol series products manufactured by Air Products and Chemicals, Inc. (examples thereof including Surfynol 104E, Surfynol 104H, Surfynol 420, Surfynol 440, Surfynol 465 and Surfynol 485) and OLFINE E1004, OLFINE E1010 and OLFINE E1020 manufactured by Nissin Chemical Industry Co., Ltd., and polyoxyethylene alkyl ether-based surfactants, such as the EMULGEN series products manufactured by Kao Corporation (examples thereof including EMULGEN 102KG, EMULGEN 103, EMULGEN 104P, EMULGEN 105, EMULGEN 106, EMULGEN 108, EMULGEN 120, EMULGEN 147, EMULGEN 150, EMULGEN 220, EMULGEN 350, EMULGEN 404, EMULGEN 420, EMULGEN 705, EMULGEN 707, EMULGEN 709, EMULGEN 1108, EMULGEN 4085 and EMULGEN 2025G).

Examples of amphoteric surfactants include the AMPHITOL series products manufactured by Kao Corporation (examples thereof including AMPHITOL 20BS, AMPHITOL 24B, AMPHITOL 86B, AMPHITOL 20YB and AMPHITOL 20N).

The viscosity of the ink may be adjusted as appropriate, but for example, from the viewpoint of the discharge properties, the viscosity at 23° C. is preferably from 1 to 30 mPa·s.

There are no particular limitations on the method used for producing the ink, and production may be performed using appropriate conventional methods. For example, the ink may be produced by using a conventional stirring device or dispersion device to mix and disperse all of the components, either in a single batch or in a number of separate batches, and then, if desired, passing the resulting mixture through a conventional filtration device such as a membrane filter.

The inkjet recording system used for the ink may employ any of various systems, including a piezo system, electrostatic system or thermal system.

<Method for Producing Printed Textile Item>

A method for producing a printed textile item according to an embodiment of the present invention includes applying a pretreatment liquid for inkjet textile printing to a fabric containing cellulose fibers (hereafter sometimes referred to as "step 1"), and forming an image using an ink for inkjet textile printing containing a pigment and water, using an inkjet recording method, on the fabric to which the pretreatment liquid has been applied (hereafter sometimes referred to as "step 2").

The pretreatment liquid for inkjet textile printing described above may be used as the pretreatment liquid for inkjet textile printing in this method. The ink for inkjet textile printing that may be used with the pretreatment liquid for inkjet textile printing as described above may be used as the ink for inkjet textile printing in this method. The fabric containing cellulose fibers that may be used with the pretreatment liquid for inkjet textile printing as described above may be used as the fabric containing cellulose fibers in this method.

In some embodiments, using this method for producing a printed textile item, fading of the printed textile item due to wet rubbing may be suppressed, and the image density of the printed textile item may be improved.

In step 1, the pretreatment liquid is preferably applied to at least the region of the fabric in which the image is formed in step 2 (hereafter sometimes referred to as the "print region"). The pretreatment liquid may be applied to the entire fabric including the print region.

There are no particular limitations on the method used for applying the pretreatment liquid in step 1, and application may be performed using a method such as a padding method, a coating method, a screen printing method, an inkjet method or a spraying method.

The amount of the pretreatment liquid applied to the fabric may be, for example, from 30 to 200 g/m$^2$, and may be from 80 to 150 g/m$^2$. Further, the amount of the pretreatment liquid applied to the fabric, relative to the mass of the fabric, is typically from 10 to 120% by mass, and may be from 20 to 100% by mass.

In step 2, by scanning an inkjet head over the top of the fabric and applying ink in the desired locations, an image may be formed on the fabric. Conventional methods and apparatus may be used as the inkjet recording method and apparatus. The inkjet recording apparatus used may use any of various systems, including a piezo system, an electrostatic system or a thermal system, and for example, liquid droplets of the ink may be discharged from the inkjet head based on a digital signal, with the discharged ink droplets being adhered to the substrate.

Examples of commercially available inkjet recording apparatus include, but are not limited to, the EPSON PX-V700 and EPSON PM-40000PX manufactured by Seiko Epson Corporation, the TX-1600S manufactured by Mimaki Engineering Co., Ltd., the FUJIFILM DMP-2831 manufactured by FUJIFILM Corporation, and the MMP-8130 manufactured by Master Mind Co., Ltd.

There are no particular limitations on the amount of ink applied to the fabric, but from the viewpoint of texture, the amount of ink per unit surface area of the fabric is preferably not more than 500 g/m$^2$, more preferably not more than 100 g/m$^2$, and even more preferably 50 g/m$^2$ or less.

The method for producing a printed textile item may also include a heating step of subjecting the fabric to a heat treatment.

For example, after step 1 and/or after step 2, a heating step of subjecting the fabric to a heat treatment is preferably performed. By performing a heat treatment, the resin can be fused to the surface of the fabric, and the water contained in the ink and the pretreatment liquid can be evaporated. By performing a heating step, an image of superior print durability tends to be obtained. There are no particular limitations on the heat treatment method, and examples include heating on a hot plate, heat press methods, normal pressure steam methods, high-pressure steam methods, and thermofixing methods. The temperature during the heat treatment is preferably capable of fusing the resin and evaporating the water, and is preferably within a range from 100° C. to 220° C., and more preferably from about 120 to 180° C.

<Ink Set for Inkjet Textile Printing>

An ink set of an embodiment of the present invention includes a pretreatment liquid for inkjet textile printing, and an ink for inkjet textile printing containing a pigment and water. The pretreatment liquid for inkjet textile printing and the ink for inkjet textile printing as described above may be used as the pretreatment liquid for inkjet textile printing and the ink for inkjet textile printing respectively in this ink set. This ink set can be used favorably with fabrics containing cellulose fibers. As the fabric containing cellulose fibers, the fabric containing cellulose fibers that may be used with the pretreatment liquid as described above may be used.

For example, in those cases in which this ink set is used with a fabric containing cellulose fiber, in some embodiments, fading of printed textile items due to wet rubbing may be suppressed and the image density of the printed textile items may be improved.

EXAMPLES

The present invention is described below in further detail based on a series of examples, but the present invention is not limited to only these examples. Unless specifically stated otherwise, "%" represents "% by mass". The blend amounts shown for the various components in the tables also indicate "% by mass" values.

<Preparation of Ink>

The materials shown in Table 1 were mixed in the blend ratio shown in Table 1, and following mixing, the mixture was filtered through a 0.8 μm cellulose acetate membrane filter to remove coarse particles, thus obtaining an ink.

TABLE 1

|  |  |  | Ionicity | Solid fraction concentration [%] | [% by mass] |
|---|---|---|---|---|---|
| Pigment dispersion | Carbon black | FUJI SP BLACK 8154 | anionic | 19 | 11 |
| Water dispersion of water-dispersible resin | Urethane resin | SUPERFLEX 460 | anionic | 38 | 10 |
| Surfactant |  | OLFINE E1010 |  |  | 6 |
| Water-soluble organic solvent |  | Glycerol |  |  | 20 |
| Water |  |  |  |  | 53 |
|  |  | Total |  |  | 100 |

The materials shown in Table 1 were as follows.

FUJI SP BLACK 8154: an aqueous carbon black dispersion (manufactured by Fuji Pigment Co., Ltd.)

SUPERFLEX 460: a water dispersion of a polycarbonate urethane resin (manufactured by DKS Co. Ltd.)

OLFINE E1010: an acetylene glycol-based surfactant (a nonionic surfactant) (manufactured by Nissin Chemical Industry Co., Ltd.)

Glycerol: manufactured by Wako Pure Chemical Industries, Ltd.

<Preparation of Pretreatment Liquids>

The raw materials shown in Tables 2 to 5 were mixed in the blend ratios shown in Tables 2 to 5, thus obtaining pretreatment liquids of a series of examples and comparative examples.

In Tables 2 to 5, "Tg" indicates the glass transition temperature. Further, "Mw" indicates the weight average molecular weight, "A" indicates the amount (% by mass) of the cellulose-based polymer relative to the total mass of the pretreatment liquid, and "B" indicates the amount (% by mass) of the water-dispersible resin relative to the total mass of the pretreatment liquid.

The weight average molecular weight values for the cellulose-based polymers shown in Tables 2 to 5 are numerical values measured by the viscosity method.

The materials shown in Tables 2 to 5 were as follows.

(Water-Dispersible Resins)

SUPERFLEX 620: a water dispersion of a polyester urethane resin (manufactured by DKS Co. Ltd.)

SUPERFLEX 650: a water dispersion of a polycarbonate urethane resin (manufactured by DKS Co. Ltd.)

SUPERFLEX 500M: a water dispersion of a polyester urethane resin (manufactured by DKS Co. Ltd.)

Mowinyl 7820: a water dispersion of an acrylic resin (manufactured by The Nippon Synthetic Chemical Industry Co., Ltd.)

Mowinyl 3500: a water dispersion of a vinyl acetate resin (manufactured by The Nippon Synthetic Chemical Industry Co., Ltd.)

SUPERFLEX 210: a water dispersion of a polyester urethane resin (manufactured by DKS Co. Ltd.)

(Cellulose-Based Polymers)

SANHEC L: a hydroxyethyl cellulose (manufactured by Sansho Co., Ltd.)

SANHEC M: a hydroxyethyl cellulose (manufactured by Sansho Co., Ltd.)

METOLOSE 65SH-50: a hydroxypropyl methyl cellulose (manufactured by Shin-Etsu Chemical Co., Ltd.)

METOLOSE 65SH-400: a hydroxypropyl methyl cellulose (manufactured by Shin-Etsu Chemical Co., Ltd.)

METOLOSE SEB-04T: a hydroxyethyl methyl cellulose (manufactured by Shin-Etsu Chemical Co., Ltd.)

METOLOSE SM-4: a methyl cellulose (manufactured by Shin-Etsu Chemical Co., Ltd.)

METOLOSE SM-15: a methyl cellulose (manufactured by Shin-Etsu Chemical Co., Ltd.)

METOLOSE SM-100: a methyl cellulose (manufactured by Shin-Etsu Chemical Co., Ltd.)

METOLOSE SM-400: a methyl cellulose (manufactured by Shin-Etsu Chemical Co., Ltd.)

<Production of Printed Textile Items>

A 100% cotton Oxford fabric that had been cut to dimensions of 210 mm×74 mm was used as test pieces.

Each of the pretreatment liquids shown in Tables 2 to 5 was applied to a test piece (fabric) using a patting method. The amount of the pretreatment liquid applied was set to 100% by mass of the mass of the test piece (fabric). Following application of the pretreatment liquid, the test piece was heated at 150° C. for 60 seconds using a Hotronix Fusion heat press (manufactured by Stahls Hotronix, Inc.). In Comparative Example 1, application of the pretreatment liquid and the subsequent heat treatment were omitted.

Subsequently, using an inkjet printer MMP813BT-3 manufactured by Master Mind Co., Ltd., the ink prepared above was used to print a solid black image onto the test piece. The amount of ink applied was about 20 g/m². Following printing, the test piece was heated at 150° C. for 60 seconds using the Hotronix Fusion heat press.

<Evaluations>

The image density and fading caused by wet rubbing were evaluated for each of the produced printed textile items using the methods described below. The results are shown in Tables 2 to 5.

(Image Density)

The OD value of the printed textile item was measured using an X-Rite eXact spectrophotometer (manufactured by X-Rite Inc) and evaluated against the following evaluation criteria.

A: OD value of 1.25 or greater
B: OD value of at least 1.18 but less than 1.25
C: OD value of less than 1.18

(Fading Caused by Wet Rubbing)

Using a Gakushin-type rubbing tester RT-200 (manufactured by Daiei Kagaku Seiki Mfg. Co., Ltd.), 100 back and forth rubbing repetitions were performed with no additional weight. The fabric attached to the tester was a 100% cotton Kanakin No. 3 cloth that had been wet with an amount of ion-exchanged water of the same weight as the fabric. The OD value of the rubbed portion was measured using an X-Rite eXact spectrophotometer, and using the OD values before rubbing and after rubbing, the degree of fading was calculated based on the following formula.

Degree of fading (%)=((OD value before rubbing)−(OD value after rubbing)/(OD value before rubbing)

The calculated degree of fading was evaluated against the following evaluation criteria.

A: degree of fading of less than 15%
B: degree of fading of at least 15% but less than 22%
C: degree of fading of 22% or greater

TABLE 2

| | [% by mass] | | Tg [° C.] | Solid fraction [% by mass] | Example 1 | 2 | 3 | 4 | 5 | 6 | 7 | 8 |
|---|---|---|---|---|---|---|---|---|---|---|---|---|
| Water dispersion of water-dispersible resin | Urethane resin (cationic) | SUPERFLEX 620 | 43 | 30 | | | | 10.0 | 10.0 | 10.0 | 10.0 | 10.0 |
| | Urethane resin (cationic) | SUPERFLEX 650 | −17 | 26 | | | | | | | | |
| | Urethane resin (nonionic) | SUPERFLEX 500M | −39 | 45 | | | | | | | | |
| | Acrylic resin (cationic) | Mowinyl 7820 | 4 | 45 | | | | | | | | |
| | Vinyl acetate resin (cationic) | Mowinyl 3500 | 30 | 45 | | | | | | | | |
| | Urethane resin (anionic) | SUPERFLEX 210 | 41 | 35 | | | | | | | | |
| Cellulose-based polymer | Hydroxyethyl cellulose | SANHEC L (Mw: 90,000) | | | | | | | 1.0 | | | |
| | | SANHEC M (Mw: 720,000) | | | | | | | | 1.0 | | |
| | Hydroxypropyl methyl cellulose | METOLOSE 65SH-50 (Mw: 100,000) | | | | | | | | | 1.0 | |
| | | METOLOSE 65SH-400 (Mw: 170,000) | | | 2.0 | | | | | | 1.0 | |
| | Hydroxyethyl methyl cellulose | METOLOSE SEB-04T (Mw: 300,000) | | | | 2.0 | | | | | | 1.0 |
| | Methyl cellulose | METOLOSE SM-4 (Mw: 20,000) | | | | | | | | | | |
| | | METOLOSE SM-15 (Mw: 70,000) | | | | | | | | | | |
| | | METOLOSE SM-100 (Mw: 120,000) | | | | | | | | | | |
| | | METOLOSE SM-400 (Mw: 170,000) | | | | | 2.0 | | | | | |
| | Water | | | | 98.0 | 98.0 | 98.0 | 89.0 | 89.0 | 89.0 | 89.0 | 89.0 |
| | Total [% by mass] | | | | 100.0 | 100.0 | 100.0 | 100.0 | 100.0 | 100.0 | 100.0 | 100.0 |
| | A + B | | | | 2.0 | 2.0 | 2.0 | 4.0 | 4.0 | 4.0 | 4.0 | 4.0 |
| | B/A | | | | — | — | — | 3.0 | 3.0 | 3.0 | 3.0 | 3.0 |
| | Image density | | | | B | B | B | A | A | A | A | A |
| | Fading caused by wet rubbing | | | | B | B | B | B | B | A | A | A |

TABLE 3

| | [% by mass] | | Tg [° C.] | Solid fraction [% by mass] | Example 9 | 10 | 11 | 12 | 13 | 14 | 15 | 16 |
|---|---|---|---|---|---|---|---|---|---|---|---|---|
| Water dispersion of water-dispersible resin | Urethane resin (cationic) | SUPERFLEX 620 | 43 | 30 | 10.0 | 10.0 | 10.0 | | | | | |
| | Urethane resin (cationic) | SUPERFLEX 650 | −17 | 26 | | | | 11.5 | | | | |
| | Urethane resin (nonionic) | SUPERFLEX 500M | −39 | 45 | | | | | 6.7 | | | |
| | Acrylic resin (cationic) | Mowinyl 7820 | 4 | 45 | | | | | | 6.7 | | |
| | Vinyl acetate resin (cationic) | Mowinyl 3500 | 30 | 45 | | | | | | | 6.7 | |
| | Urethane resin (anionic) | SUPERFLEX 210 | 41 | 35 | | | | | | | | 8.6 |
| Cellulose-based polymer | Hydroxyethyl cellulose | SANHEC L (Mw: 90,000) | | | | | | | | | | |
| | | SANHEC M (Mw: 720,000) | | | | | | | | | | |
| | Hydroxypropyl methyl cellulose | METOLOSE 65SH-50 (Mw: 100,000) | | | | | | | | | | |
| | | METOLOSE 65SH-400 (Mw: 170,000) | | | | | | | | | | |
| | Hydroxyethyl methyl cellulose | METOLOSE SEB-04T (Mw: 300,000) | | | | | | | | | | |

TABLE 3-continued

|  |  |  | Tg [° C.] | Solid fraction [% by mass] | Example |  |  |  |  |  |  |  |
|---|---|---|---|---|---|---|---|---|---|---|---|---|
|  |  |  |  |  | 9 | 10 | 11 | 12 | 13 | 14 | 15 | 16 |
|  | Methyl cellulose | METOLOSE SM-4 (Mw: 20,000) |  |  |  |  |  |  |  |  |  |  |
|  |  | METOLOSE SM-15 (Mw: 70,000) |  |  | 1.0 |  |  |  |  |  |  |  |
|  |  | METOLOSE SM-100 (Mw: 120,000) |  |  |  | 1.0 |  |  |  |  |  |  |
|  |  | METOLOSE SM-400 (Mw: 170,000) |  |  |  |  | 1.0 | 1.0 | 1.0 | 1.0 | 1.0 | 1.0 |
|  | Water |  |  |  | 89.0 | 89.0 | 89.0 | 87.5 | 92.3 | 92.3 | 92.3 | 90.4 |
|  | Total [% by mass] |  |  |  | 100.0 | 100.0 | 100.0 | 100.0 | 100.0 | 100.0 | 100.0 | 100.0 |
|  | A + B |  |  |  | 4.0 | 4.0 | 4.0 | 4.0 | 4.0 | 4.0 | 4.0 | 4.0 |
|  | B/A |  |  |  | 3.0 | 3.0 | 3.0 | 3.0 | 3.0 | 3.0 | 3.0 | 3.0 |
|  | Image density |  |  |  | A | A | A | A | B | A | A | A |
|  | Fading caused by wet rubbing |  |  |  | A | A | A | A | B | B | B | B |

TABLE 4

|  |  |  | Tg [° C.] | Solid fraction [% by mass] | Example |  |  |  |  |  |  |
|---|---|---|---|---|---|---|---|---|---|---|---|
|  |  |  |  |  | 17 | 18 | 19 | 20 | 21 | 22 | 23 |
| Water dispersion of water-dispersible resin | Urethane resin (cationic) | SUPERFLEX 620 | 43 | 30 | 5.0 | 5.0 | 40.0 | 30.0 | 50.0 | 10.0 | 10.0 |
|  | Urethane resin (cationic) | SUPERFLEX 650 | −17 | 26 |  |  |  |  |  |  |  |
|  | Urethane resin (nonionic) | SUPERFLEX 500M | −39 | 45 |  |  |  |  |  |  |  |
|  | Acrylic resin (cationic) | Mowinyl 7820 | 4 | 45 |  |  |  |  |  |  |  |
|  | Vinyl acetate resin (cationic) | Mowinyl 3500 | 30 | 45 |  |  |  |  |  |  |  |
|  | Urethane resin (anionic) | SUPERFLEX 210 | 41 | 35 |  |  |  |  |  |  |  |
| Cellulose-based polymer | Hydroxyethyl cellulose | SANHEC L (Mw: 90,000) |  |  |  |  |  |  |  |  |  |
|  |  | SANHEC M (Mw: 720,000) |  |  |  |  |  |  |  |  |  |
|  | Hydroxypropyl methyl cellulose | METOLOSE 65SH-50 (Mw: 100,000) |  |  |  |  |  |  |  |  |  |
|  |  | METOLOSE 65SH-400 (Mw: 170,000) |  |  |  |  |  |  |  |  |  |
|  | Hydroxyethyl methyl cellulose | METOLOSE SEB-04T (Mw: 300,000) |  |  |  |  |  |  |  |  |  |
|  | Methyl cellulose | METOLOSE SM-4 (Mw: 20,000) |  |  |  |  |  |  |  |  |  |
|  |  | METOLOSE SM-15 (Mw: 70,000) |  |  |  |  |  |  |  |  |  |
|  |  | METOLOSE SM-100 (Mw: 120,000) |  |  |  |  |  |  |  |  |  |
|  |  | METOLOSE SM-400 (Mw: 170,000) |  |  | 1.0 | 5.0 | 1.0 | 0.5 | 5.0 | 0.5 | 5.0 |
|  | Water |  |  |  | 94.0 | 90.0 | 59.0 | 69.5 | 45.0 | 89.5 | 85.0 |
|  | Total [% by mass] |  |  |  | 100.0 | 100.0 | 100.0 | 100.0 | 100.0 | 100.0 | 100.0 |
|  | A + B |  |  |  | 2.5 | 6.5 | 13.0 | 9.5 | 20.0 | 3.5 | 8.0 |
|  | B/A |  |  |  | 1.5 | 0.3 | 12.0 | 18.0 | 3.0 | 6.0 | 0.6 |
|  | Image density |  |  |  | A | B | A | A | A | A | A |
|  | Fading caused by wet rubbing |  |  |  | A | B | A | B | B | A | A |

TABLE 5

|  |  |  | Tg [° C.] | Solid fraction [% by mass] | Comparative Example |  |  |
|---|---|---|---|---|---|---|---|
|  |  |  |  |  | 1 | 2 | 3 |
| Water dispersion of water-dispersible resin | Urethane resin (cationic) | SUPERFLEX 620 | 43 | 30 | No pretreatment |  |  |
|  | Urethane resin (cationic) | SUPERFLEX 650 | −17 | 26 |  |  |  |
|  | Urethane resin (nonionic) | SUPERFLEX 500M | −39 | 45 |  |  | 10.0 |
|  | Acrylic resin (cationic) | Mowinyl 7820 | 4 | 45 |  |  |  |
|  | Vinyl acetate resin (cationic) | Mowinyl 3500 | 30 | 45 |  |  |  |
|  | Urethane resin (anionic) | SUPERFLEX 210 | 41 | 35 |  |  |  |
| Cellulose-based polymer | Hydroxyethyl cellulose | SANHEC L (Mw: 90,000) |  |  |  |  |  |
|  |  | SANHEC M (Mw: 720,000) |  |  |  |  |  |
|  | Hydroxypropyl methyl cellulose | METOLOSE 65SH-50 (Mw: 100,000) |  |  |  |  |  |
|  |  | METOLOSE 65SH-400 (Mw: 170,000) |  |  |  |  |  |
|  | Hydroxyethyl methyl cellulose | METOLOSE SEB-04T (Mw: 300,000) |  |  |  |  |  |
|  | Methyl cellulose | METOLOSE SM-4 (Mw: 20,000) |  |  |  | 2.0 |  |
|  |  | METOLOSE SM-15 (Mw: 70,000) |  |  |  |  |  |
|  |  | METOLOSE SM-100 (Mw: 120,000) |  |  |  |  |  |
|  |  | METOLOSE SM-400 (Mw: 170,000) |  |  |  |  |  |
|  | Water |  |  |  |  | 98.0 | 90.0 |
|  | Total [% by mass] |  |  |  |  | 100.0 | 100.0 |
|  | A + B |  |  |  | — | — | 4.5 |
|  | B/A |  |  |  | — | — | — |
|  | Image density |  |  |  | B | C | C |
|  | Fading caused by wet rubbing |  |  |  | C | C | C |

In Examples 1 to 23, each of which used a pretreatment liquid containing a cellulose-based polymer having a weight average molecular weight of at least 50,000, the image density was high, and fading caused by wet rubbing was able to be suppressed.

Comparative Example 1 in which a pretreatment liquid was not used, Comparative Example 2 in which the pretreatment liquid contained a cellulose-based polymer having a low molecular weight, and Comparative Example 3 in which the pretreatment liquid did not contain a cellulose-based polymer all suffered from inferior image density and fading caused by wet rubbing.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A pretreatment liquid for inkjet textile printing, the pretreatment liquid comprising water, a cellulose-based polymer having a weight average molecular weight of at least 50,000, and a water-dispersible resin.

2. The pretreatment liquid for inkjet textile printing according to claim 1, wherein when an amount (% by mass) of the cellulose-based polymer relative to a total mass of the pretreatment liquid for inkjet textile printing is termed A, and an amount (% by mass) of the water-dispersible resin relative to a total mass of the pretreatment liquid for inkjet textile printing is termed B, formula (1) and formula (2) shown below are both satisfied $$2.0 < A+B < 15.0 \quad \text{Formula (1)}$$

$$0.5 < B/A < 15.0. \quad \text{Formula (2)}$$

3. The pretreatment liquid for inkjet textile printing according to claim 1, wherein the water-dispersible resin comprises a cationic water-dispersible resin.

4. The pretreatment liquid for inkjet textile printing according to claim 1, wherein the water-dispersible resin comprises a cationic water-dispersible urethane resin.

5. The pretreatment liquid for inkjet textile printing according to claim 1, wherein the cellulose-based polymer comprises at least one polymer selected from the group consisting of hydroxypropyl methyl cellulose, hydroxyethyl methyl cellulose and methyl cellulose.

6. The pretreatment liquid for inkjet textile printing according to claim 1, which is for use on a fabric comprising cellulose fibers.

7. A method for producing a printed textile item, the method comprising:
    applying a pretreatment liquid for inkjet textile printing comprising water and a cellulose-based polymer having a weight average molecular weight of at least 50,000, to a fabric comprising cellulose fibers, and
    forming an image using an ink for inkjet textile printing comprising a pigment and water, using an inkjet recording method, on the fabric to which the pretreatment liquid for inkjet textile printing has been applied.

8. The method for producing a printed textile item according to claim 7, wherein the pretreatment liquid for inkjet textile printing further comprising a water-dispersible resin.

9. The method for producing a printed textile item according to claim 8, wherein when an amount (% by mass) of the cellulose-based polymer relative to a total mass of the pretreatment liquid for inkjet textile printing is termed A, and an amount (% by mass) of the water-dispersible resin relative to a total mass of the pretreatment liquid for inkjet textile printing is termed B, formula (1) and formula (2) shown below are both satisfied $$2.0 < A+B < 15.0 \quad \text{Formula (1)}$$

$$0.5 < B/A < 15.0. \quad \text{Formula (2)}$$

10. The method for producing a printed textile item according to claim 8, wherein the water-dispersible resin comprises a cationic water-dispersible resin.

11. The method for producing a printed textile item according to claim 8, wherein the water-dispersible resin comprises a cationic water-dispersible urethane resin.

12. The method for producing a printed textile item according to claim 7, wherein the cellulose-based polymer comprises at least one polymer selected from the group consisting of hydroxypropyl methyl cellulose, hydroxyethyl methyl cellulose and methyl cellulose.

13. An ink set for inkjet textile printing, the ink set comprising:
    a pretreatment liquid for inkjet textile printing comprising water and a cellulose-based polymer having a weight average molecular weight of at least 50,000, and
    an ink for inkjet textile printing comprising a pigment and water.

14. The ink set for inkjet textile printing according to claim 13, wherein the pretreatment liquid for inkjet textile printing further comprising a water-dispersible resin.

15. The ink set for inkjet textile printing according to claim 14, wherein when an amount (% by mass) of the cellulose-based polymer relative to a total mass of the pretreatment liquid for inkjet textile printing is termed A, and an amount (% by mass) of the water-dispersible resin relative to a total mass of the pretreatment liquid for inkjet textile printing is termed B, formula (1) and formula (2) shown below are both satisfied $$2.0 < A+B < 15.0 \quad \text{Formula (1)}$$

$$0.5 < B/A < 15.0. \quad \text{Formula (2)}$$

16. The ink set for inkjet textile printing according to claim 14, wherein the water-dispersible resin comprises a cationic water-dispersible resin.

17. The ink set for inkjet textile printing according to claim 14, wherein the water-dispersible resin comprises a cationic water-dispersible urethane resin.

18. The ink set for inkjet textile printing according to claim 13, wherein the cellulose-based polymer comprises at least one polymer selected from the group consisting of hydroxypropyl methyl cellulose, hydroxyethyl methyl cellulose and methyl cellulose.

19. The ink set for inkjet textile printing according to claim 13, which is for use on a fabric comprising cellulose fibers.

20. The pretreatment liquid for inkjet textile printing according to claim 1, wherein the water-dispersible resin comprises at least one selected from the group consisting of a water-dispersible urethane resin, a water-dispersible acrylic resin, a water-dispersible vinyl acetate resin, a water-dispersible styrene-(meth)acrylic resin, a water-dispersible vinyl chloride resin, and a water-dispersible polyamide resin.

* * * * *